United States Patent [19]

Arrowsmith

[11] 4,177,888

[45] Dec. 11, 1979

[54] FRICTION CLUTCH PLATE WITH TWO CONCENTRIC HUBS FOR DAMPING

[75] Inventor: David R. Arrowsmith, Leamington Spa, England

[73] Assignee: Automotive Products Limited, Warwickshire, England

[21] Appl. No.: 859,853

[22] Filed: Dec. 12, 1977

[30] Foreign Application Priority Data

Jan. 4, 1977 [GB] United Kingdom ............... 00014/77

[51] Int. Cl.² .............................................. F16D 3/14
[52] U.S. Cl. .................................. 192/106.2; 64/27 C
[58] Field of Search ............... 192/106.2, 106.1, 70.17, 192/70.16; 64/27 C

[56] References Cited

U.S. PATENT DOCUMENTS 4,024,938  5/1977  Maucher ........................... 192/106.2

FOREIGN PATENT DOCUMENTS 1952620  6/1971  Fed. Rep. of Germany ........ 192/106.2

Primary Examiner—Benjamin Wyche
Assistant Examiner—David C. Reichard
Attorney, Agent, or Firm—Kemon & Estabrook

[57] ABSTRACT

The invention relates to automobile friction clutch driven plates, and in particular to driven plates having idling vibration dampers and load vibration dampers. The friction clutch driven plate includes two concentric hub members. On one hub member is mounted a friction facing carrier capable of limited restrained angular movement about the hub axis relative to the hub members. The friction facing carrier and the other hub member have spring seatings, being hub member seatings and carrier seatings, so that springs acting between the seatings oppose relative rotational movement between the hub members. The construction of the driven plate is made compact and simplified by having the hub member seatings and carrier seatings in a common radial plane.

18 Claims, 6 Drawing Figures

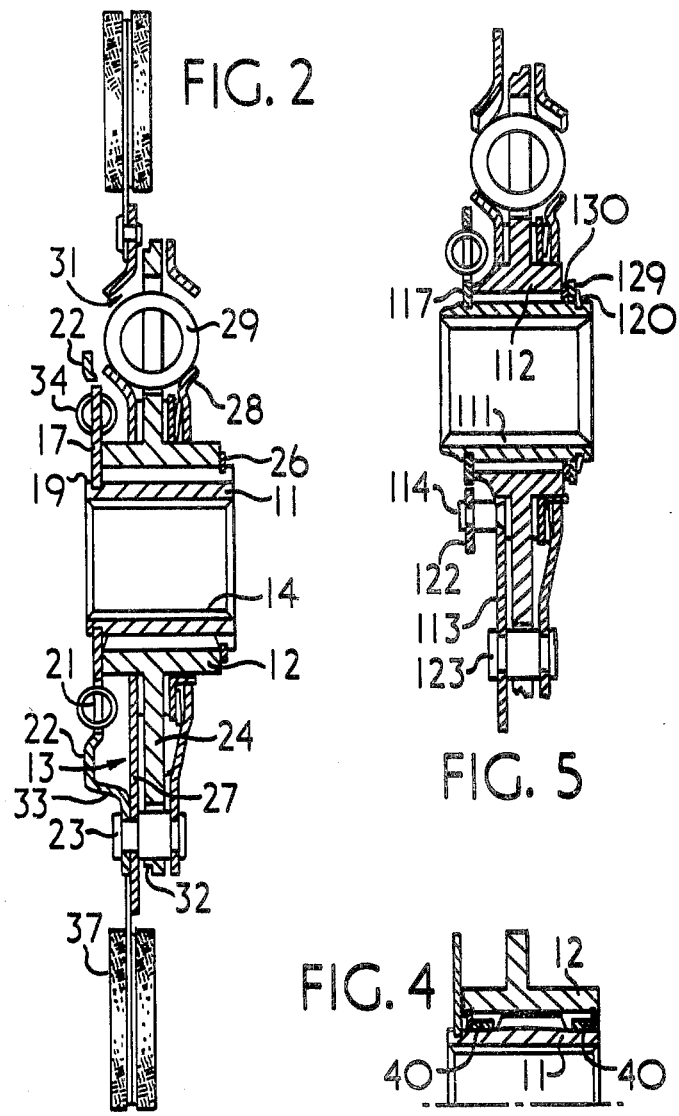

FRICTION CLUTCH PLATE WITH TWO CONCENTRIC HUBS FOR DAMPING

This invention relates to clutch driven plates for the friction clutches of automobiles.

Clutch driven plates which utilise two sets of damping means in the torque load transmission path through the driven plate are well known. Furthermore the use of a weaker set of springs as an initial damping means for the idling vibration damper and a stronger set of spring for the load vibration damper is also known.

The object of the present invention is to provide a simplified construction of a clutch driven plate with an idling vibration damper and a load vibration damper.

According to the invention there is provided a friction clutch driven plate assembly having two concentric hub members, on one of which is mounted a friction facing carrier capable of limited restrained angular movement about the hub member axis relative to the hub members, the friction facing carrier and the other hub member having spring seatings interposed, being hub member and carrier seatings, in a common radial plane so that springs acting between the spring seatings restrain relative rotational movement between the hub members.

Preferably the spring seatings are all in the form of abutment surfaces.

Conveniently the abutments all lie on a circle around the hub axis.

It is preferable for the abutments on the first hub member to be part of an annular flange fast with and disposed around the first hub member such that the flange is normal to the longitudinal axis of the hub and conveniently is adjacent one end of the hub member, and conveniently the abutments are adjacent the radially outer periphery of said annular flange.

Conveniently there is a second set of springs which act so as to restrain relative movement between the friction facing carrier and the one hub member and the second set of springs is located radially outside the spring seatings and is a stiffer spring means than the springs acting between the spring seatings.

The abutments on the annular friction facing carrier are conveniently provided as part of an annular plate, attached at its radially outer periphery to the rest of the facing carrier.

Preferably the flange on the first hub member has apertures in the outer periphery thereof, and the annular plate has radial projections on the inner periphery thereof, and the projections and apertures are aligned such that said projections are loosely interengageable with the apertures so as to accomodate radial overlap between the plate and flange which are substantially co-planar, whilst allowing for circumferential movement of the plate relative to the flange.

Preferably each of the springs are located and supported between the respective edge of apertures and respective side face of the radial projections by a pair of aligned circumferential projections which jut one into each end portion of the spring and there is sufficient circumferential clearance between the circumferential projections for the fitting of the helical springs and for the required relative rotational movement of the friction facing carrier relative to the first hub member.

Conveniently the relative rotational movement between the first hub member and the second hub member is facilitated by fitting bushes between the hub members, and the bushes are located one at each axial end of the hub between the first and second hub members.

Preferably the bushes are slightly oval to provide built-in friction damping. It is preferable for some friction damping to operate between the annular friction facing carrier and one of the first or second hub members.

One embodiment of this invention will now be described by way of example and with reference to the following drawings in which:

FIG. 2 is a section on the line II—II in FIG. 1;

FIG. 4 shows a modified lost-motion arrangement between the first and second hub members; and FIG. 5 and FIG. 6 show a slightly modified clutch driven plate.

Figure 1:
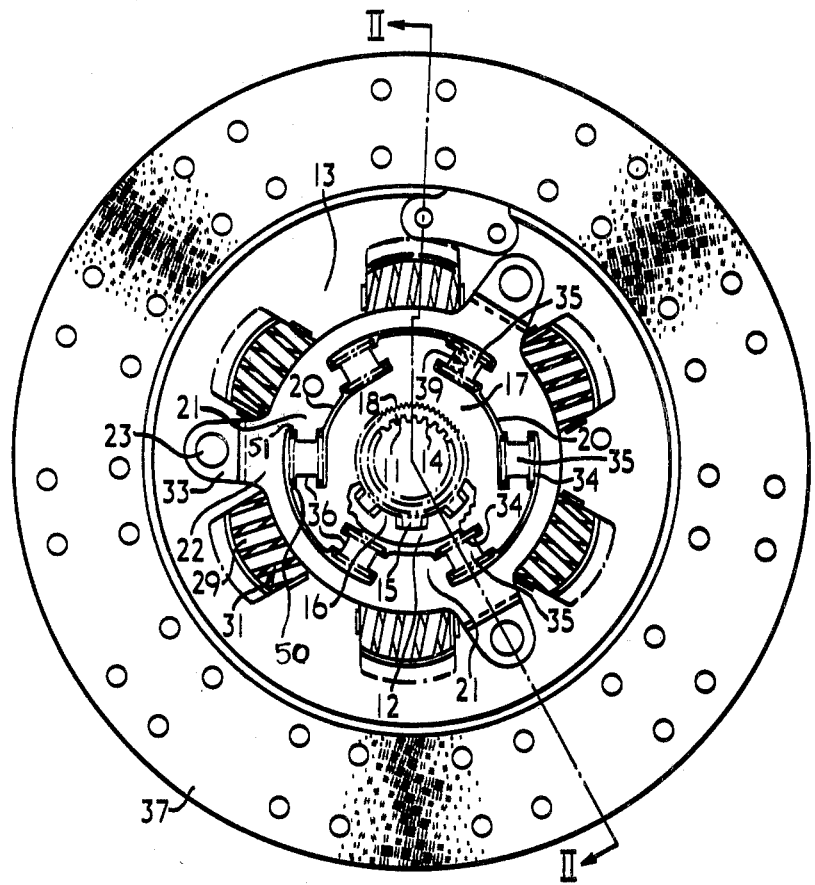
FIG. 1 is a view of a clutch driven plate according to this invention with a section of one component removed to reveal detail of the lost-motion means.

With reference to FIG. 1 and FIG. 2, the clutch driven plate comprises three major substantially concentric constituents: a first hub member 11, a second hub member 12 and an annular friction facing carrier 13.

The first hub member 11 is internally splined 14 for attachment to the input shaft of a gearbox (not shown) and has external splines 15 which are adapted to co-operate with the internal splines 16 of the concentric second hub member 12 so that there is a lost-motion means between the first and second hub members which allows the second hub member limited angular rotation relative to the first hub member before the splines 15 abut against the splines 16. The first hub member 11 has an annular flange 17 which is fast with or alternatively is integral with the hub member 11 and is disposed around the hub member so that the flange 17 is normal to the longitudinal axis of the hub member and is adjacent one end of the hub member 11. The flange 17 is secured to the rest of the first hub member 11 by being splined 18 thereon and then deforming the radially outer surface 19 of the one end of the hub member 11 to hold it axially in position.

The radially outer periphery of the annular flange 17 has three equiangularly spaced circumferentially elongated apertures 20 therein. These elongated apertures 20 are circumferentially aligned with three radially inward projections 21 on the radially inner periphery of a dished annular plate 22 which is attached at its outer periphery by three stop pins 23 to the annular friction facing carrier 13. The projections 21 lie in the same plane as the annular flange 17 such that each projection 21 is loosely accommodated within its corresponding aperture 20 to form three very loose interengaging joints between the annular flange 17 of the first hub member 11 and the dished plate 22 of the friction facing carrier 13 such that there is a large amount of circumferential play between flange 17 and the plate 22.

The second hub member 12 has a substantially axially central annular flange 24 which lies in a plane normal to the longitudinal axis of the hub members. The second hub member 12 is concentric with and movable relative to the first hub member 11 as previously described, and is axially located on the first member by abutment of one end of the hub member 12 against the flange 17 and at its other end the hub member 12 is held in position by a circlip 26 which grips the outer periphery of that corresponding portion of the first hub member.

An annular friction facing carrier 13 is formed from a carrier plate 27 disposed on one side of the flange 24 adjacent the flange 17 and a retaining plate 28 on the other side of the flange 24. The two plates 27 and 28 being secured together against relative movement by the three stop pins 23. The annular friction facing carrier 13 so formed is capable of limited angular rotational movement relative to both the first and second hub members 11 and 12. A second resilient means provided by a plurality of circumferentially arranged helical springs 29, housed in aligned apertures 31 in the flange 24 and the plates 27 and 28, acts between the second hub member 12 and the annular friction facing carrier 13 to oppose the relative angular rotation therebetween, the stop pins 23 co-operating with other apertures 32 in the flange 24 to limit the degree of relative rotation.

The dished annular plate 22 is attached at its radially outer periphery to the rest of the friction facing carrier by the stop pins 23 which pass through three equiangularly displaced legs, the three legs defining the rim and sides of the dish. As previously described, the projections 21 on the radially inner periphery of the dished plate 22 form loose interengaging joints between the plate 22 and the flange 17. Thus there are six spaces 35 in total between each of the three projections 21 and the sides of each of the corresponding apertures 20 in the flange 17. Six helical springs 34 are housed in these spaces 35, one per space and each spring acts between spring seatings which are constituted by abutments formed as edges 50 of the apertures 20 in the flange 17, and side faces 51 on the projections 21 of the carrier plate 22. The springs 34 act in a peripheral direction. The six springs 34 constitute a first resilient means which is more flexible than the second resilient means constituted by the springs 29. The springs are located against axial movement (that is axial to the hub member) by peripheral projections 36 which project axially relative to each spring into each end of the springs 34.

When the torque load from the engine is applied via the flywheel and pressure plate to the friction facings 37, the initial resistance to rotation of the facing carrier 13 relative to the first hub member 11 is provided by the weaker springs 34. The second hub member 12 and the facing carrier 13 moving as a single unit. When the lost-motion movement between the first and second hub members 11 and 12 respectively has been taken up then both the hubs 11 and 12 become effectively a single hub centre, and further rotation of the facing carrier 13 relative to the hub member 11 must overcome the load in the stiffer springs 29 so that the friction facing carrier 13 now also moves relative to the second hub member 12. This further relative rotational movement is against the loads present in both the springs 34 and 29, and will continue until the edge of the apertures 32 in the flange 24 abut the stop pins 23. The total movement relative rotation movement of the friction facing carrier 13 to the first hub member 11 being approximately ±9°. The position of maximum displacement being illustrated by FIG. 3 and by dotted lines 39 in FIG. 1.

Figure 3:
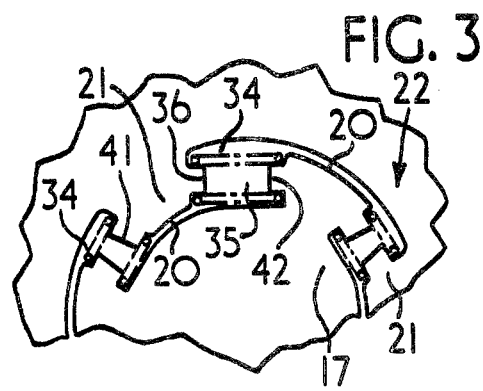
FIG. 3 is a detail from FIG. 1 showing the first set of springs after 9° relative rotation between the first hub and the annular friction facing carrier.

With reference to FIG. 3 when the dished plate 22 of the friction facing carrier 13 moves anticlockwise relative to the flange 17 of the first hub member 11 then for each of the apertures 20 as the projection 21 moves relative to the edges of the aperture 20, the spring 34 on the leading face 41 of the projection 21 is compressed and the spring 34 on the trailing edge 42 of the aperture 20 is allowed to expand. The springs 34 are sufficiently precompressed to prevent the springs 34 from jumping off the projections 36 after relaxation of some of them at 9° relative rotation position, and this also helps prevent vibration noises when the springs are in the neutral position.

If all the six springs 34 have the same characteristics then taking FIG. 3 as an example, both springs 34 on the leading and trailing edges have the same spring characteristics and the neutral position will be at the mid point of the total movement, i.e. 0° in this particular case with a total movement of 19°. If however the spring rates are arranged such that for any given pair of springs the leading face 41 spring is stiffer than the trailing edge 42 spring, then the neutral point can be shifted to be for example at 6° so that the total movement is $-6°+12°$.

An alternative method of offsetting the neutral position is to offset the position of the flange 17 with respect to the external splines 15 on the first hub member 11.

Since the springs 34 operating on the leading face 41 of the projection 21 and on the trailing edge 42 of the aperture 20 work as a pair and are pre-compressed, then movement of the projection 21 from the equilibrium position, where the load in both springs is the same, results an increase in load in the spring on the leading face 41 and a decrease in load in the spring on the trailing edge 42. For a pair of substantially equal springs this effectively gives the spring on the leading face a spring rate which is twice that of the individual spring.

With reference to FIG. 4, it may be necessary to fit bushes between the first hub member 11 and the second hub member 12 to facilitate movement between first and second hub members. Such bushes 40 are located at each end of the hub between the concentric members. This reduces the area of interaction between the splines 15 and 16 in the lost-motion means. Furthermore friction damping arrangements may be introduced into movement between the first and second hub members by slightly distorting the bushes 40 into a slight oval shape so that the second hub member rubs against the high spots on the bushes.

Figure 6:
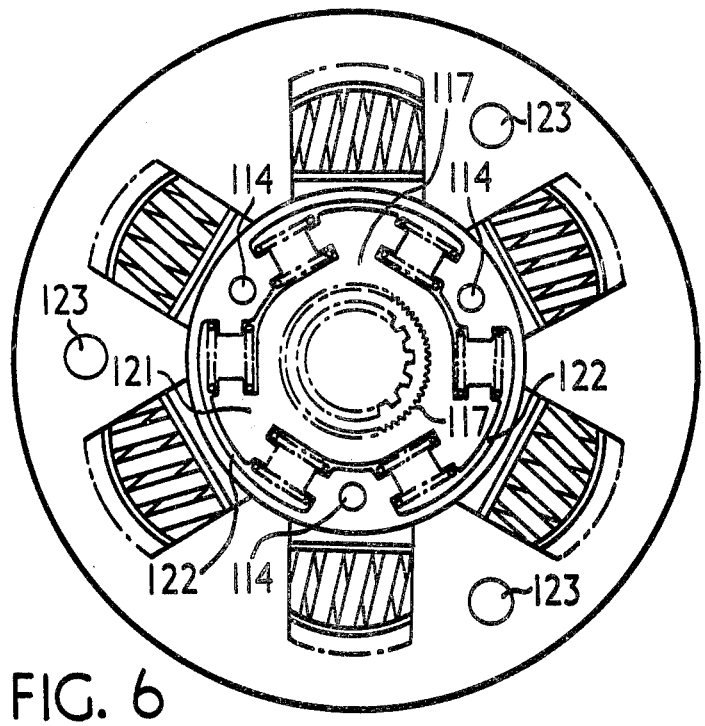

FIG. 5 and FIG. 6 show a slightly modified version of the clutch driven plate according to this invention. The dished plate 22 in FIG. 1 has been replaced by a small annular plate 122 which is attached to the annular friction facing carrier 113 by three rivets 114, these rivets not being the stop pins 123.

Also the amount of limited relative angular rotation of the facing carrier 113 to the first hub member 111 has been increased to ±12°.

Friction damping between the first and second hub members 111, 112 respectively is provided by the action of a circlip 120 acting like a belleville spring. The circlip 120 located in a groove on the first hub member bears against a washer 129, a friction washer 130, and pushes the second hub member 112 against the flange 117 of the first hub member 111. Thus friction damping is applied at both ends of the hub between the first and second hub members. A friction washer may be interposed between the flange 117 and the second hub member.

This particular construction of friction clutch driven plate is very compact and is of a simple construction with a minimum of parts.

I claim:
1. A friction clutch driven plate comprising:
   a first hub member;
   a second hub member concentric with the first hub member and capable of limited angular movement about the hub axis relative to the first hub member;

a friction facing carrier mounted on the second hub member by means allowing restrained limited angular movement about the hub axis relative to the second hub member;

springs seatings located on the first hub member and the carrier such that the first hub member seatings and the carrier seatings lie in a common radial plane;

and springs acting between the first hub member seatings and the carrier seatings so as to restrain the relative movement between the first hub member and second hub members.

2. A friction clutch driven plate as claimed in claim 1, wherein the spring seatings are in the form of abutment surfaces provided on the first hub member and the facing carrier.

3. A friction clutch driven plate as claimed in claim 2, wherein the abutment surfaces lie in a circle around the hub axis.

4. A friction clutch driven plate as claimed in claim 3, wherein the abutments on the first hub member are formed on an annular flange fast with and disposed around the first hub member and normal to the said axis.

5. A friction clutch driven plate as claimed in claim 4, wherein the abutment surfaces are adjacent the radially outer periphery of the annular flange.

6. A friction clutch driven plate as claimed in claim 5, wherein the annular flange is adjacent one end of the first hub member.

7. A friction clutch driven plate as claimed in claim 4, wherein the abutments on the friction facing carrier are formed on an annular plate attached by its radially outer periphery to said facing carrier.

8. A friction clutch driven plate as claimed in claim 7, wherein:

the flange on the first hub member has apertures in the outer periphery thereof;

the annular plate has radial projections on the inner periphery thereof, said projections being arranged to circumferentially align with said apertures;

such that the projections are loosely interengageable with the apertures so as to accomodate radial overlap between the substantially coplanar plate and flange whilst allowing for some circumferential movement of the plate relative to the flange.

9. A friction clutch driven plate as claimed in claim 8, wherein: the edges of the apertures form the abutment surfaces on the flange; and the side faces of the radial projections form the abutment surfaces on the annular plate.

10. A friction clutch driven plate as claimed in claim 9, wherein the springs are helical springs which are arranged so that for each projection in its co-operating aperture there are two springs arranged to act in opposition to each other and located one either side of the projection such that each spring acts between an edge of the aperture and a side face of the projection.

11. A friction clutch driven plate as claimed in claim 10, wherein the helical springs are preloaded so that they are retained between their respective edge and side face.

12. A friction clutch driven plate as claimed in claim 11, wherein the helical springs each have the same spring characteristics and are each preloaded to the same extent.

13. A friction clutch driven plate as claimed in claim 11, wherein each helical spring is located and supported between the respective opposing aperture edge and respective side face of the radial projection by a pair of aligned circumferential projections which jut one into each portion of the spring from each of the opposed edge and face, and the pair of projections have sufficient circumferential clearance therebetween so as to allow the springs to be fitted and also to allow for the required relative rotational movement between the friction facing carrier and the other hub member.

14. A friction driven plate as claimed in claim 1, wherein the relative rotational movement between the hub members is facilitated by fitting bushes between said hub members and the bushes are located one at each axial end of the hubs.

15. A friction clutch driven plate as claimed in claim 14, wherein the bushes are slightly oval so as to provide some frictional damping to movement between the first and second hub member.

16. A friction clutch driven plate as claimed in claim 7, wherein the annular plate is dish shaped and which is attached to the friction facing carrier at its radially outer periphery and its radially inner portion is axially offset away from the facing carrier.

17. A friction clutch driven plate as claimed in claim 1, wherein there is a second set of springs located so as to restrain rotational movement between the friction facing carrier and the second hub member on which the carrier is mounted and the second set of springs is arranged to be radially outside the spring seatings.

18. A friction clutch driven plate as claimed in claim 17, wherein the springs acting between the spring seatings are less stiff than the second set of springs.

* * * * *